July 16, 1963 W. T. RENTSCHLER 3,097,583
PHOTOGRAPHIC CAMERA
Original Filed Feb. 29, 1960
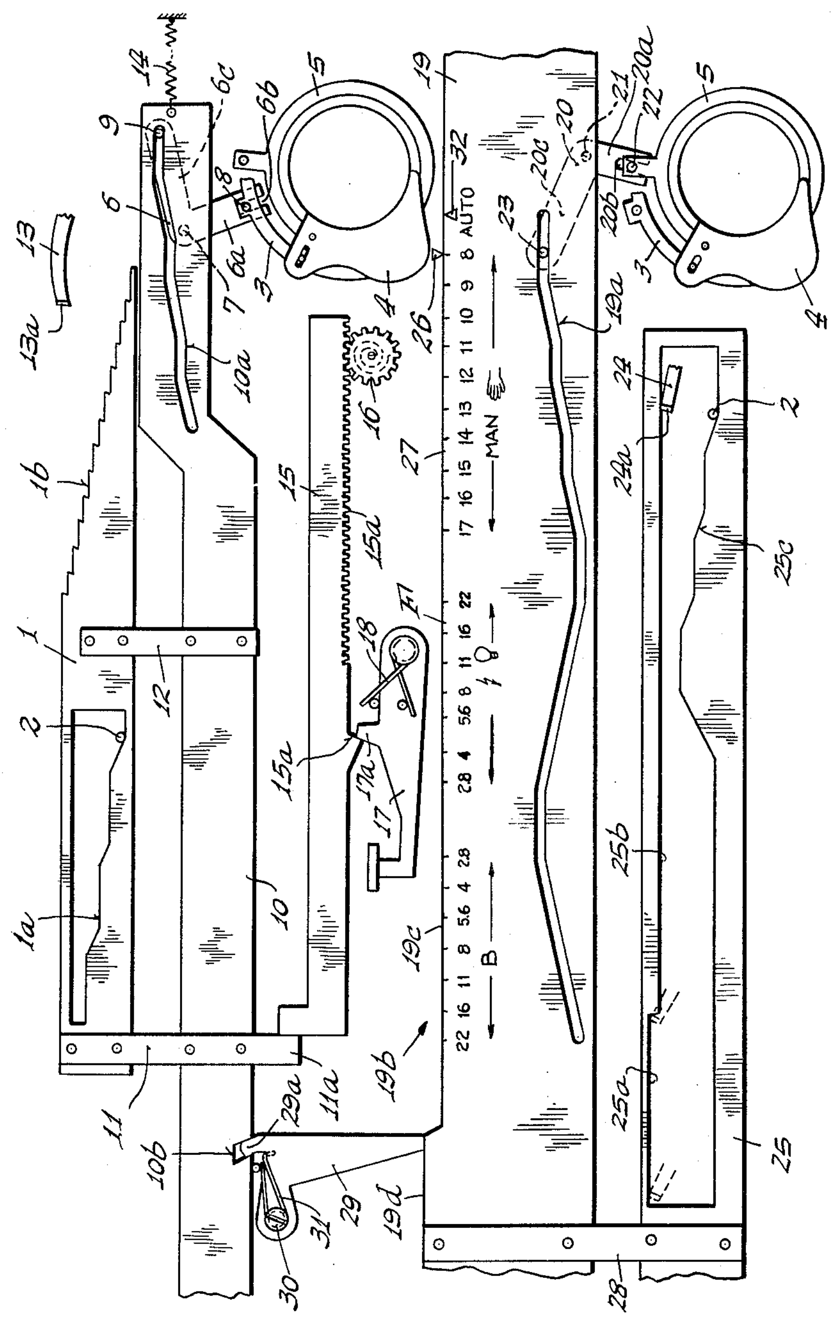
INVENTOR.
Waldemar T. Rentschler
BY
March, Gillette, Virgil & Eslinger
ATTORNEYS United States Patent Office 3,097,583 Patented July 16, 1963

1

3,097,583
PHOTOGRAPHIC CAMERA

Waldemar T. Rentschler, Calmbach (Enz), Germany, assignor to Alfred Gauthier G.m.b.H., Calmbach (Enz), Germany, a corporation of Germany Continuation of application Ser. No. 11,865, Feb. 29, 1960. This application June 29, 1962, Ser. No. 207,852
Claims priority, application Germany Mar. 2, 1959
7 Claims. (Cl. 95—10)

The invention relates to photographic cameras of the type wherein the speed and diaphragm setting members are fixedly interconnected and related to provide various predetermined speed diaphragm pairs representing exposure values so arranged as to provide uniform exposure-value gradations over a given range of settings. This application is a continuation of Serial Number 11,865, filed Feb. 29, 1960, and now abandoned.

In the past it has been proposed to construct cameras of the above type, which are adapted to take photographs not only with an automatic exposure setting adjustment but also with a manual setting adjustment when the automatic adjustment is not desired. In such cameras the diaphragm blades or segments are arranged on two movable, reciprocally shiftable adjusting members one of which is coupled to the exposure time or shutter speed setting member whereas the other adjusting member is shiftable for the purpose of correlating the entire diaphragm adjustment range with a single specific shutter speed. However, cameras constructed in this manner have the disadvantage that they do not permit certain kinds of exposures involving a manual setting to be carried out where such setting is required other than the predetermined single specific shutter speed.

The above-described disadvantage and drawback of this type of camera is obviated by the present invention, and one object of the invention is to provide a novel and improved photographic camera of the kind outlined above, which is so organized and arranged that for the manual setting operation exposures of different kinds, involving shutter speeds other than the predetermined speed which is selected for use with the various diaphragm apertures may be had, while at the same time effecting a desirable, simple and economical construction which may be readily manufactured.

The present invention accomplishes this and solves the problem by a novel organization which still makes use of the known and tested assemblage wherein the diaphragm blades or segments are mounted in the well-known manner on two movable, reciprocally shiftable adjustable members which may be alternately operated or adjusted on the basis of prescribed and starting positions, one of said adjusting members being coupled to a combined exposure-time or shutter-speed setting member and first diaphragm setting member, being automatically movable in response to operation of a light intensity measuring device for the purpose of effecting automatic exposure settings. However, with the present novel organization the other adjusting member, which includes a second diaphragm adjusting member and second speed setting member, is manually operable and arranged to cooperate with a special device which influences or regulates the amount of the open time of the camera shutter.

The invention thus provides a photographic camera of the above described general type which, however, can be used both for automatically effected exposures and exposures effected manually while not imposing any restrictions as to the shutter speed, this being accomplished with a simple, reliably operative structure. This important feature and advantage which is realized in such a camera, results from the fact that the operative connection between the manually operable diaphragm adjusting member and the said special device which influences the the amount of open time of the camera shutter produces the greatest possible freedom of motion and provides complete independence in the selection of the shutter speeds as well in the manner in which they are correlated with the manually operable adjusting member. This enables exposure times or shutter speeds of all possible values to be had for the taking of photographs utilizing a manual exposure setting, all in a simple and easily understandable manner and with little additional expenditure or cost.

2

Included in the organization various shutter speeds may be had besides those.

Also included, by the above organization, are shutter speeds which are not automatically controlled by the shutter mechanism.

The above includes, more particularly, exposure times not automatically controlled by the shutter and which can be obtained in a camera constructed in accordance with the invention without involving any additional expenditure or cost, this being accomplished by utilizing as the device which influences the amount of open time of the camera shutter, a well known mechanism for producing B-exposures.

In accordance with a further construction as provided by the invention, the operativeness of the camera in the event that the automatic exposure setting device becomes inoperative is insured by constituting the special device which influences the amount of the open time of the camera shutter as a control device which produces automatically run-off exposure times of different amounts, and by correlating specific diaphragm values with the said exposure times in a fixedly related, predetermined manner.

This results in a novel camera-setting structure as provided by the invention, which may be particularly advantageous because of its simplicity and enonomy of manufacture when the setting position of the speed setting member which provides the longest exposure time is associated with the starting position of the first diaphragm adjusting member, and when the second diaphragm adjusting member is connected to another speed setting member which also cooperates with the same speed regulating device which is associated with the first speed setting member, the second speed setting member when set at "automatic" position also effecting a shutter adjustment which gives the longest exposure time.

According to a further camera construction as provided by the invention, a well known device for effecting B-exposures can be controlled, in a manner known per se, by means of the second exposure time setting member.

The accompanying FIGURE is a diagrammatic representation of a camera setting and control system as provided by the invention. The figure illustrates one embodiment of the invention, and shows the operative connections of the various setting members of the camera.

Referring now to the single figure, the numeral 1 indicates an exposure time or shutter speed setting member, also termed a "first" speed setting member. The setting member 1 includes a control cam 1*a*, which cooperates with a cam follower pin 2 constituted as part of a well-known exposure time or shutter speed escapement mechanism which is not shown in the drawing for the sake of clarity of illustration. Operatively fixedly connected or coupled with the speed setting member 1 to move as a unit therewith is a first diaphragm adjusting member or ring 3, which is described in detail below and which provides a correlation between the shutter speed and the diaphragm values in a closed setting range having uniform exposure value gradations. Assuming that the diaphragm setting range extends between the values 2.8 and 22, and that the shutter speed setting range varies from $\frac{1}{30}$ sec. to $\frac{1}{250}$ sec., the speed-diaphragm values may be correlated, for example, as follows.

| Speed or exposure time: | Diaphragm aperture |
|---|---|
| 30 | 2.8 |
| 60 | 2.8 |
| 60 | 4 |
| 60 | 5.6 |
| 125 | 5.6 |
| 125 | 8 |
| 125 | 11 |
| 250 | 11 |
| 250 | 16 |
| 250 | 22 |

This correlation of exposure time or shutter speed and diaphragm values results in a uniform graduated series of exposure values, comprising the values 8 to 17, see the scale 27.

In accordance with the invention, the segments or blades 4 of the objective diaphragm may be arranged in a well-known and well-tested manner per se, on two movable, reciprocally shiftable adjusting members or rings 3 and 5 intended to be alternately operable on the basis of certain prescribed starting positions, the adjusting member 3 being mechanically coupled, as already mentioned, to the first speed setting member 1 and being automatically moved and set in response to operation of a light intensity measuring device for the purpose of effecting an automatic exposure setting, whereas the adjusting member 5 is manually operated and is constituted to cooperate with a special device for influencing or adjusting the amount of the open time of the camera shutter.

The connection of the annular diaphragm adjusting member 3 with the exposure time setting member 1 (which latter is shown as being in the form of a slide) is established, in the illustrated embodiment of the invention, by a bell crank or angle-shaped lever 6 which is pivotally mounted on a stationary axis 7 provided on the camera. One arm 6_a_ of the bell crank 6 has a pin and slot connection 6_b_, 8 with the diaphragm ring 3 which constitutes a "first" diaphragm adjusting member, whereas the other arm 6_c_ has a pin 9 which is received in a control slot or control mechanism 10_a_ provided in a slide 10, constituting a "first" diaphragm setting member and which latter is fixedly secured to the speed setting member 1 by means of two rails 11 and 12.

Instead of being constructed as slides, as shown in the figure, the two members 1 and 10 may have annular or ring-like shapes, thereby to adapt them to constructional conditions of well known cameras. The light intensity measuring device, which effects actuation of the diaphragm control members 3, 10 and the speed setting member 1 may be constructed in any well known or proposed manner, one suitable construction being illustrated and described, for example in United States Letters Patent No. 3,004,481, issued October 17, 1961, and entitled Photographic Camera With Electric Exposure Regulator.

The automatic control and actuation of the setting members 1 and 10 is effected mechanically, and involves a mechanical stop which may be variously positioned by the light intensity measuring device and which cooperates with a stepped cam 1_b_ provided on the speed setting member 1. The adjustable stop is constituted as a pivoted lever 13 which may also be connected to a sensing device or follower, preferably in a pressure-relief type of organization, engageable with a cam or equivalent means provided on the turnable coil of a galvanometer which is fed by current from a photoelectric cell. Such control devices have also been described, for example, in German Patent 832,390 and in French Patent 1,138,435.

In the illustrated embodiment of the invention, the setting members 1 and 10 are shown in their starting positions which correspond to the loaded condition of a driving spring 14 connected with and acting on the setting member 10. In order to insure that for such position the control galvanometer which effects the variable positioning of the stop lever 13 may be freely movable and may freely respond to the prevailing light intensity, the sensing or cam follower means associated with the stop lever 13 is disengaged from the cam or equivalent control means of the turnable coil of the galvanometer. This can be accomplished by the provision of a cam (not shown for the sake of clarity of illustration) on one of the setting members 1 or 10 which will shift the lever 13 to a position to effect such disengagement, even when the galvanometer responds to the maximum light intensity.

The halting of the power-driven setting members 1 and 10 during the shifting of such members by the spring 14 from left to right is effected by the lever 13, as it is positioned in the path of movement of the stepped edge 1_b_. After a short initial movement of the members 1 and 10, the lever 13 will occupy its proper adjusted position as determined by the rotative position of the turnable coil of the galvanometer, such adjusted position of the lever being indicative of the prevailing light intensity. Depending on the adjusted position of the lever 13, the setting member 1 will be permitted a greater or lesser adjusting movement from left to right, until one of the steps on the edge 1_b_ abuts a bent lug 13_a_ provided on the end of the lever 13. With the organization shown the lowest step of the edge 1_b_ corresponds to the minimum light value, and the highest step corresponds to the maximum value of the light intensity which can be indicated by the light intensity measuring device.

In order to load the driving spring 14 connected to the two setting members 1 and 10 there is provided a slide 15 which cooperates with the extended end 11_a_ of the connecting rail 11, in the manner shown in the drawings. The slide 15 is moved in spring-loading direction (from right to left) preferably in response to setting or cocking of the shutter, or in response to advance of the film transparent device of the camera by means of a gear 16 and rack 15_a_, and the setting members 1 and 10 can be secured in their starting positions shown in the figure, which are associated with the loaded condition of the driving spring 14, by means of a detent device arranged to act on the slide 15.

The said detent device comprises, in the illustrated embodiment of the invention, a pawl 17 which has a lug 17_a_ arranged to be cooperable with a projection 15_a_ provided on the slide 15. For the purpose of releasing the slide 15 and in consequence releasing the setting members 1 and 10, the detent pawl 17 is operable in a counterclockwise direction against the action of a coil spring 18, in response to the release operation of the camera. The connection with the camera release can be effected in the form of any well known transmission device.

In order to insure that the automatic exposure setting operation is completed prior to opening of the camera shutter, it is possible to arrange a well-known delayed-action means which is releasable in response to or simultaneously with the release of the camera or of the shutter, said delaying mechanism permitting a delayed operation of the shutter by a specific time interval with respect to the release operation of the camera or the shutter and said time interval being so selected that the setting members 1 and 10 controlled by the light intensity measuring device may travel through their maximum path of movement prior to opening of the shutter.

The second diaphragm adjusting ring 5 which is manually operable and which is arranged to cooperate with a special device for influencing the amount of open time of the camera shutter is connected to an actuating slide 19, also termed a "second diaphragm setting member," in a manner similar to the connection provided for the first diaphragm adjusting ring 3. In this case also, the connection is effected by an angle shaped lever or bell-crank 20, which is pivotally positioned about a stationary pin 21 provided on the camera. One arm 20a of the lever 20 has a pin and slot connection 20b, 22 with the diaphragm adjusting ring 5, whereas the other arm 20c has a pin 23 affixed to it and receivable in a control slot 19a of the actuating slide 19.

The special device which cooperates with the actuating slide 19 for the purpose of effecting photographs with manual exposure settings, and which influences the amount of open time of the camera shutter comprises, in the illustrated embodiment of the invention, firstly, a well-known device for producing B-photographs. The embodiment shows this device for reasons of clarity of illustration, only as a control lever 24 which has a bent end portion or lug 24a engageable under the action of a spring (not shown) with a B-cam connected to the actuating slide 19 in a manner which will be described in detail below. The B-cam comprises two partial ranges 25a and 25b. When the slide 19 is in a setting position wherein the lever 24 engages the partial range 25a of the cam, the B-device is placed in its operative position, i.e., the position wherein it detains the shutter in open position after the latter has been released and opened, for as long as the shutter release is depressed. If, on the other hand, the slide 19 is in its setting position wherein the lever 24 engages the partial range 25b of the cam, the B-device is rendered inoperative. Associated with the partial range 25a of the B-cam is a partial designated adjusting range "B" of the actuating slide 19, which comprises the entire diaphragm adjusting range from the aperture values of 2.8 to 22. This provides a possibility, in the case of B-photographs, of bringing about a change of the depth of focus by appropriately selecting the diaphragm aperture, thereby insuring the best possible adaptability of the exposure setting to the respective objects to be photographed.

The device associated with the slide 19 and which influences the amount of open time of the camera shutter further comprises a control device for obtaining automatically run-off exposure times of different amounts, with specific diaphragm values being associated with the said times in a fixedly predetermined manner. This enables the camera to be used for the taking of photographs even in the case where the automatic exposure device becomes inoperative for some reason.

In the illustrated embodiment of the invention the diaphragm values are correlated with the shutter speeds of different values, in such a manner that a uniformly graduated series of exposure values is produced which comprises the values from 8 to 17. These values are indicated on the actuating slide 19, in the form of a scale 27 arranged to cooperate with a stationary index mark 26. To identify the use of the scale 27, there is further associated with said scale the letters "MAN."

The control device for obtaining the automatically run-off exposure times is, in the illustrated embodiment of the invention, the same shutter speed regulating device which is associated with the speed setting member 1. For this purpose, the control pin 2 of the said speed regulating device is arranged to cooperate with a cam 25c, provided on a slide 25 constituting a second speed setting member and which is connected to the slide 19.

The cam 25c, together with the B-cam 25a, 25b are both provided on the special slide-like member 25, which is fixedly attached to the slide 19 by means of a rail 28.

The use of but a single shutter speed regulating device having the pin 2, for both the automatically operated speed setting means and the manually actuated setting means produces a particularly economical and advantageous camera construction.

For the purpose of obtaining a desirable and reliable method of operation of the setting device, the invention provides that during an exposure setting, those speed and diaphragm setting members which are not utilized in the setting operation are positioned and arranged in such a manner that the control influence of the non-used speed adjusting member on the speed regulating device is not effective.

For this purpose the starting position of the first diaphragm adjusting and setting members 3, 10 is associated with a setting position of the speed setting member 1 which corresponds to the longest exposure time, and the second speed setting member 25 is also made to occupy a setting position corresponding to the longest exposure time when the slide 19 is in its starting position, which corresponds to the setting position required of said slide to effect automatic exposures, marked "AUTO."

In order to make sure that the setting members will reliably occupy their respective starting positions, the invention provides therefor a novel interlock device which permits switching or shifting from automatic to manual exposure settings only when the first diaphragm adjusting and setting members 3, 10 are in their starting positions corresponding to the loaded condition of the driving spring 14.

The interlock device, as illustrated in the embodiment of the invention, comprises a pawl 29 which is pivotally carried by a pin 30 provided on the camera. The pawl 29 is biased in a clockwise direction by a coil spring 31, to cause it to engage a cam 19b of the actuating slide 19, and said pawl has a projection 29a which is receivable in a recess 10b provided on the first diaphragm slide 10. The cooperation between the pawl 29 and the slides is such that when the slide 19 is at the setting "automatic," which is effected by bringing about a coincidence between the index mark 26 and another index mark 32 provided on the slide 19 and designated with the letters "AUTO," the pawl 29 under the urging of the spring 31 is disengaged from the cam edge 19d of the cam 19b, thereby enabling the projection 29a of the pawl to become disengaged from the recess 10b of the diaphragm slide 10. Upon shifting the slide 19 into the setting position shown in the figure (manual adjustment, exposure value 8), the pawl 29 engages the camming edge 19d of the cam 19b, and is pivoted by the latter against the action of the spring 31, so as to cause the projection 29a to engage the recess 10b. It is a prerequisite of this last operation that the diaphragm slide 10 be in its starting position shown, which is associated with the loaded condition of the driving spring 14. If such is not the case, the projection 29a of the pawl will abut the lower boundary edge of the diaphragm slide 10, thereby preventing the shifting of the actuation slide 19 from automatic to non-automatic setting.

As is further apparent from the figure, the actuating slide 19 has a third setting range "F" which is designed to be used for flash exposures. To allow the taking of flash photographs, the entire diaphragm adjustment range in this setting is associated with a single exposure time, which is $\frac{1}{30}$ sec. as shown in the illustrated embodiment of the invention.

What is claimed is:

1. In a photographic camera, in combination, fixedly connected, movable speed and diaphragm setting members movable at all times as a single unit, said diaphragm setting member including a control mechanism which is related to the speed setting member to provide uniform exposure value gradations over a given range of movement of the unit; two physically separate reciprocally adjustable diaphragm adjusting members which are separate from said speed and diaphragm setting members and which are adapted for carrying the diaphragm blades, movement of either member effecting adjustment of the diaphragm aperture; coupling means between one adjusting member and said setting members, effecting adjustment of said one adjusting member in response to movement of said setting members; light-responsive means for effecting automatic adjustment of the said setting members; manually operable means for effecting adjustment of the other of said adjusting members; a shutter control device for influencing the amount of open time of the shutter; and means, separate from said speed setting member, for actuating said device in response to adjustment of the said other of said adjusting members.

2. The invention as defined in claim 1, in which the shutter control device comprises a device for effecting B-exposures of the shutter.

3. The invention as defined in claim 1, in which the shutter control device comprises control means for effecting different shutter speeds, independently of said speed setting member, said different shutter speeds being correlated with specific diaphragm values in a predetermined manner.

4. The invention as defined in claim 3, in which the speed and diaphragm setting members are movable from starting positions, in which the shutter control device includes another speed setting member which is settable in a position labeled "automatic," the said "automatic" and "starting" positions of the said other speed setting and speed-and-diaphragm setting members respectively providing for longest shutter exposure times.

5. The invention as defined in claim 4, in which there is a device for effecting B-exposures of the shutter, controlled by the said other speed setting member.

6. In a photographic camera of the type which may be set either automatically or manually, and which has an automatic setting mechanism comprising fixedly connected, movable exposure-time and diaphragm setting members correlated to provide uniform exposure value gradations over a given range, in combination, two physically separate reciprocally adjustable diaphragm adjusting members; diaphragm blades carried by said members, movement of either member effecting adjustment of the diaphragm aperture; means connecting one of said adjusting members to the exposure-time setting member, said members thus connected being automatically moved to effect automatic setting of the camera and the remaining diaphragm adjusting member being movable to effect manual setting of the camera; and manually operable means comprising a single selector member settable in different selecting positions, for rendering operative or inoperative at will the automatic setting mechanism, said selector member being connected with said remaining diaphragm adjusting member and being adapted to actuate the same and effect a diaphragm adjustment when it has rendered inoperative the automatic setting mechanism.

7. In a photographic camera of the type which may be set either automatically or manually, and which has an automatic setting mechanism comprising fixedly connected, movable exposure-time and diaphragm setting members correlated to provide uniform exposure value gradations over a given range, in combination, two physically separate reciprocally adjustable diaphragm adjusting members; diaphragm blades carried by said members, movement of either member effecting adjustment of the diaphragm aperture; means connecting one of said adjusting members to the exposure-time setting member, said members thus connected being automatically moved to effect automatic setting of the camera and the remaining diaphragm adjusting member being movable to effect manual setting of the camera; and means settable in different selecting positions, for rendering operative or inoperative at will the said automatic setting mechanism, said means being connected with said remaining diaphragm adjusting member and being adapted to actuate the same and effect a diaphragm adjustment when the means has rendered inoperative the automatic setting mechanism.

References Cited in the file of this patent

UNITED STATES PATENTS

| | | |
|---|---|---|
| 2,868,095 | Gebele | Jan. 13, 1959 |
| 2,911,897 | Fahl | Nov. 10, 1959 |